United States Patent [19]

Takeda et al.

[11] Patent Number: 4,587,089

[45] Date of Patent: May 6, 1986

[54] FUEL ASSEMBLY FOR BOILING WATER REACTOR

[75] Inventors: Renzo Takeda, Kawasaki; Kazuyoshi Miki, Hitachi; Yukiharu Ohga, Hitachi; Motomasa Fuse, Hitachi; Kazuo Hiramoto, Hitachi; Motoo Aoyama, Hitachi, all of Japan

[73] Assignee: Hitachi, Ltd., Tokyo, Japan

[21] Appl. No.: 464,215

[22] Filed: Feb. 7, 1983

[30] Foreign Application Priority Data

Feb. 8, 1982 [JP] Japan ................................. 57-17504

[51] Int. Cl.$^4$ ............................................. G21C 15/02
[52] U.S. Cl. .................................... 376/428; 376/434; 376/435

[58] Field of Search ....................... 376/435, 428, 434

[56] References Cited

U.S. PATENT DOCUMENTS 4,244,784  1/1981  Takeda ................................. 376/435

Primary Examiner—Donald P. Walsh
Attorney, Agent, or Firm—Antonelli, Terry & Wands

[57] ABSTRACT

Provided is a fuel assembly for a boiling water reactor. The fuel assembly comprises fuel rod arranged in an 8-lines/8-columns square lattice, water rod and a channel box surrounding these fuel rods and water rods. A central portion corresponds to 80% of the fuel rod comprises fuel pellet having an outer diameter of 10.31 mm and inner diameter of 5.95 mm.

11 Claims, 10 Drawing Figures

FUEL ASSEMBLY FOR BOILING WATER REACTOR

BACKGROUND OF THE INVENTION

The present invention relates to a reactor. More particularly, the present invention relates to a reactor having a fuel assembly which is excellent in the safety, the resistance to earthquake, the stability, the fuel soundness and the fuel economy.

Since commercial boiling water reactors were put into practical use, the latice structure of fuel rods of the fuel assembly have been changed from the 7-lines/7-columns structure to the 8-lines/8-columns structure, but the amount of uranium charged in the fuel assembly has not substantially been changed. The reason is that the characteristics of the core depend greatly on the value of the water-to-uranium ratio, and in making a partial change of the design, it is safer not to substantially change the amount of uranium charged in the fuel assembly. As a means for improving the fuel soundness, there has recently been proposed a method in which a hole having a diameter of about 3 mm is formed at the center of a fuel pellet. Also in this method, the change of the power factor is maintained at the conventional level by adjusting the size of the hole so that the change of the amount of uranium is within 10%.

The thought concerning the safety of a light-water reactor has been changed little by little for these twenty years. At the initial stage of the development, it was considered that the safety would be higher with an increase of the negative power factor administering the power self-control of automatically reducing the power when the power is increased by some cause or other and the amount of voids in a moderator is increased, and reactors were designed under this idea. However, to the compressed cold water transient phenomenon crushing voids, such as closing of a main vapor isolation valve or loss of feed water, too large a negative power factor results in reduction of the stability.

At the present, the re-processing cost is larger than the cost of enrichment of uranium, and charging of a large quantity of uranium-238 not participating directly in fission in the core and transfer of this core to a reprocessing plant will result in increase of the fuel cycle cost, and the weight of the core will be unnecessarily increased and the resistance of earthquake will be reduced.

SUMMARY OF THE INVENTION

It is a primary object of the present invention to provide a reactor in which the earthquake resistance of the core is improved and the change of the power at the transient stage is reduced.

In a boiling water reactor, if the amount charged of uranium and plutonium per 175 $cm^2$ of the sectional area per cm of the length in a channel box is changed from the conventional value of 0.47 kg to 0.40 to 0.28 kg in the central portion of a fuel assembly exclusive of the upper and lower end portions, which central portion corresponds to 80% of the fuel assembly, the stability, the fuel soundness at the time of an abrupt change of the power, the resistance to earthquake and the fuel economy can be improved and the change of the power at the transient stage can be reduced.

This new idea is created by smaching the conventional thought that if the negative void coefficient is reduced, the power self-control characteristic is reduced and if the degree of enrichment is elevated, the fuel cycle cost is increased.

A typical exchangeable fuel assembly for BWR is characterized by an enrichment degree of 2.8% by weight and an average take-out burn-up of 28000 MWD/T, and the void coefficient of the core constructed by this fuel assembly is - 12 cent/% void. If the enrichment degree of the fuel assembly is increased to 3.2% by weight and the amount charged of uranium is reduced to 80% of the conventional value, the power generated by the fuel assembly through its life is substantially equal to the power generated by the conventional fuel assembly. The void coefficient of the core constructed by this fuel assembly is about 75% of the conventional value, and the necessary amount of natural uranium can be saved by about 7% and the quantity of SWU necessary for enrichment is substantially equal to that of the conventional fuel assembly.

From the results of the analysis of this core at the transient stage, it is seen that there are no substantial changes with respect to all the accidents for which the negative power factor is significant. This means that a negative power factor exceeding a certain level is not effective for the self-control of the power. Furthermore, if the enrichment degree per MWD is made higher than the conventional level and the amount charged of uranium is reduced, the ratio of utilization of neutron can be improved and the neutron multiplication factor of the new fuel assembly can be increased. Accordingly, the neutron multiplication factor of the fuel assembly present in the core just before the take-out operation can be reduced below the conventional level, resulting in an improvement of the fuel economy. Viewed from another angle, the concentration of uranium-235 in the used fuel assembly taken out from BWR is about 0.8% by weight. On the other hand, the concentration of uranium-235 in deteriorated uranium as the tail from an enrichment plant is 02% by weight. Accordingly, if the fuel is used in the enrichment plant as much as possible, the ratio of effective utilization of uranium-235 is increased.

It is worthy of attention that in a fuel assembly of the type described hereinbefore, the safety, the earthquake resistance, the stability, the fuel soundness and the fuel economy can be improved by means described below according to the present invention.

In order to reduce the amount of uranium and plutonium charged per unit volume, reduction of the diameter of fuel rods is considered effective. However, the surface area of the fuel rods is decreased and thermal conditions become severe.

As means for attaining the above object without making thermal conditions severer than those adopted at the present, there can be considered the following three methods.

According to the first methods, a large hole is formed in the central portion of a fuel rod and an annular fuel pellet is adopted. In order to prevent falling of the fuel pellet due to cracking thereof, it is considered effective to insert into the hollow portion a Zircaloy tube or graphite tube or support the interior by a low density fiber composed of Zirconium, graphite or silicon. Furthermore, since the temperature difference in the fuel pellet is reduced because of the annular shape thereof, it is possible to form an unbreakable pellet by utilizing the fine ceramic technique or the like. Moreover, if a washer-like pellet is formed by reducing the height of the pellet, the effect of preventing cracking of the fuel pellet is enhanced.

According to the second method, a substance having a high heat conductivity and a low capacity of absorbing neutron is incorporated into an oxide powder of uranium and plutonium. As such substance, there can be mentioned SiC and BeO.

According to the third method, the existent 8-lines/8-columns lattice arrangement of fuel rods is changed to a 9-lines/9-columns lattice arrangement to moderate the thermal conditions, the amount charged of uranium and plutonium is reduced, and the diameter of fuel rods for the so-called 9-lines/9-columns lattice arrangement is further reduced to decrease the pressure loss of a coolant. Additional spacers are disposed by utilizing the resulting margin of the pressure loss to control the tendency of the fuel rods to be bent, which is due to the reduction of the diameter of the fuel rods, whereby the defect of the conventional 9-lines/9-columns lattice arrangement can be overcome. Furthermore, a hollow portion having a diameter of about 3 mm is formed at the center of the fuel pellet, whereby the surface area of the fuel rod can be increased and the central temperature of the fuel rod can be lowered. Moreover, by adoption of the 9-lines/9-columns lattice arrangement, increased to 3 to 5, whereby the neutron utilization efficiency can be improved and the power distribution in the fuel assembly can be uniformalized, resulting in an improvement of the fuel economy.

DESCRIPTION OF THE PREFERRED EMBODIMENTS

The present invention will now be described in detail with reference to the following embodiments.

Figure 1:
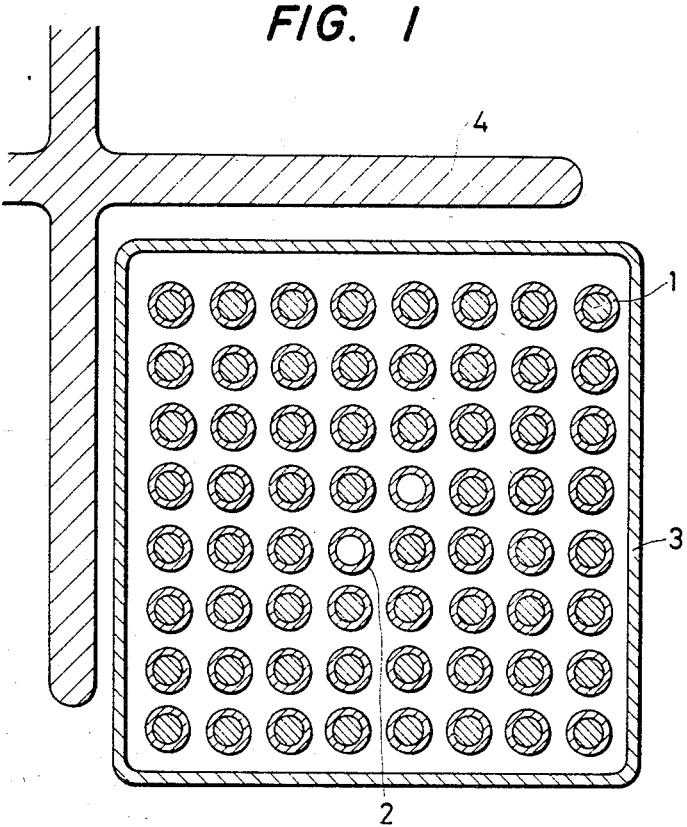
FIG. 1 is a cross-sectional view of a fuel assembly according to one embodiment of the present invention.
Figure 2:
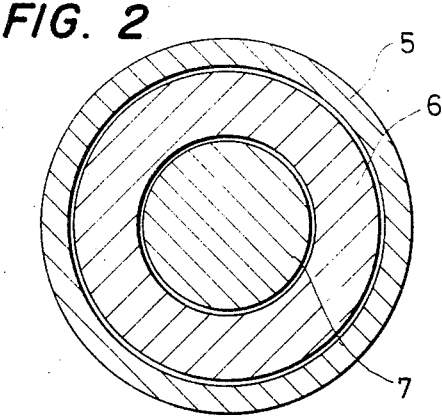
FIG. 2 is a cross-sectional view of a fuel rod used for the fuel assembly shown in FIG. 1.

FIG. 1 is a cross-sectional view of a fuel assembly for BWR according to one preferred embodiment of the above-mentioned first method of the present invention. This fuel assembly comprises fuel rods 1 arranged in an 8-lines/8-columns square lattice, water rods 2 and a channel box 3 surrounding these fuel rods 1 and water rods 2. There are present coolant flow channels among these fuel rods 1 and water rods 2 within the channel box 3. A control rod 4 is inserted between two adjacent fuel assemblies. The fuel assembly for BWR according to the present invention has the same shape and structure as those of the conventional fuel assembly for BWR except the interior structure of the fuel rod. As is seen from FIG. 2 showing the interior of the fuel rod, a fuel pellet 6 having an outer diameter of 10.31 mm and an inner diameter of 5.95 mm is arranged in a covering tube 5 and a cylindrical low-density fiber 7 of graphite is inserted in the fuel pellet 6 to prevent falling of the fuel pellet due to cracking thereof. In this embodiment, by adoption of this annular fuel pellet, the amount charged of uranium can be reduced to $\frac{2}{3}$ of the conventional amount and the weight of the fuel assembly can be reduced to 80% of the conventional weight, and since the outer diameter of the fuel rod is the same as that of the conventional fuel rod, the thermal conditions are the same as those in the conventional fuel assembly.

Figure 3:
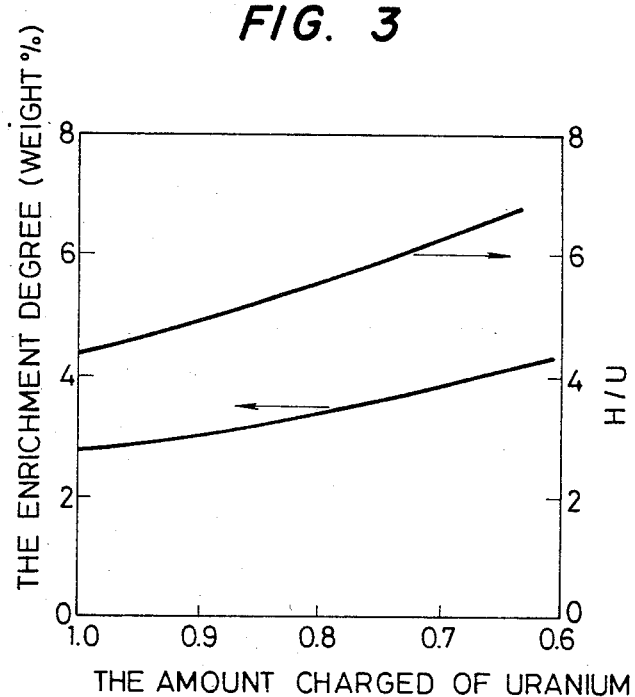
FIG. 3 is a graph showing the relations of the amount charged of uranium to the enrichment degree and the water-to-uranium ratio.
Figure 4:
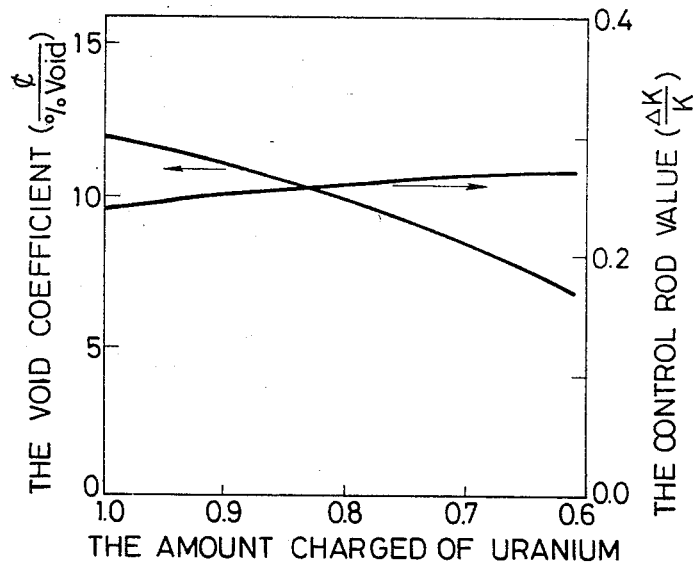
FIG. 4 is a graph showing the relations of the amount charged of uranium to the void coefficient and the control rod value.

FIG. 3 shows the relation between the enrichment degree and the amount charged of uranium under such a condition that the power generated by the fuel assembly through its life is constant. From FIG. 3, it is seen that in the present embodiment where the amount charged of uranium is reduced to $\frac{2}{3}$ of the conventional amount, the average enrichment degree of the fuel assembly is 4.1% by weight and the water-to-uranium ratio (atom number ratio) is 1.5 times the conventional value. Since the water-to-uranium ratio is increased, thermal reaction of neutron is advanced and uranium-235 is effectively utilized. Simultaneously, the absolute value of the void coefficient can be decreased and the value of the control rod can be increased. FIG. 4 shows the relations of the amount charged of uranium to the void coefficient and the control rod value. In the present embodiment, the void coefficient is about 65% of the conventional value, and the negative power factor of the core is reduced. On the other hand, the control rod value is increased by about 13% as compared with the conventional value. Accordingly, the surface area of $B_4C$ contained in the control rod can be reduced, and by virtue of increase of the space between $B_4C$ and the constituent material, the life of the control rod can be prolonged.

Figure 5:
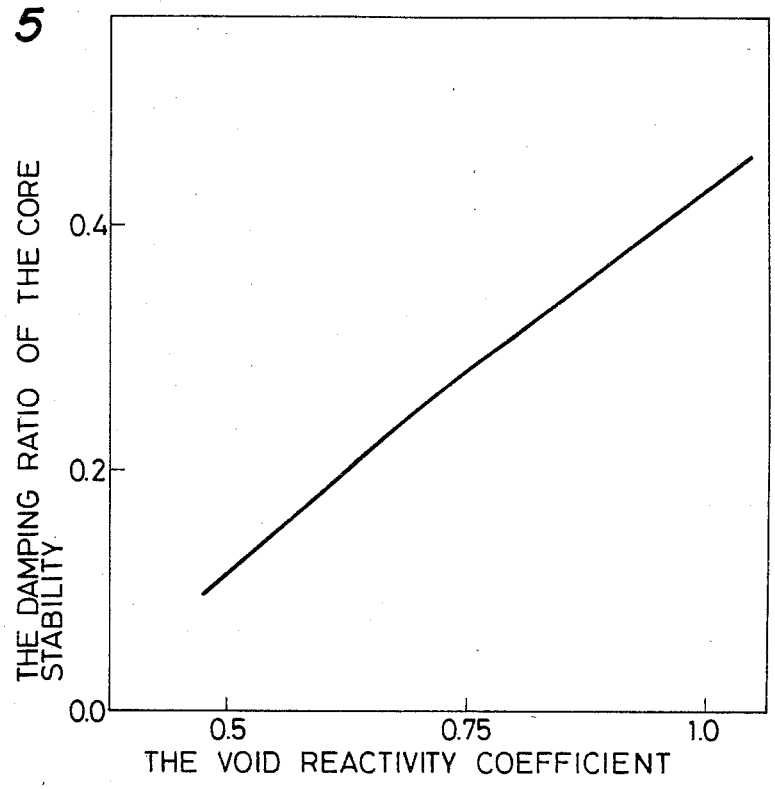
FIG. 5 is a graph showing the relation between the void reactivity coefficient and the damping ratio of the core stability.

FIG. 5 shows influence of the change of the void reactivity coefficient on the stability of the core. In FIG. 5, the void reactivity coefficient, calculated based on the assumption that the void reactivity coefficient of the conventional fuel assembly is 1.0, is plotted on the abscissa and the damping ratio of the stability of the core is plotted on the ordinate. Although the damping ratio is changed according to the operation state of the reactor, in FIG. 5, the change of the damping ratio in the natural circulation maximum power operation providing a worst core stability is shown. From FIG. 5, it is seen that if the amount of uranium charged in the fuel assembly is reduced and the negative void reactivity coefficient is reduced, the stability of the core can be improved. Incidentally, in other operation states, the stability of the core is improved with reduction of the void reactivity coefficient, though absolute values of the damping ratio differ.

Figure 6:
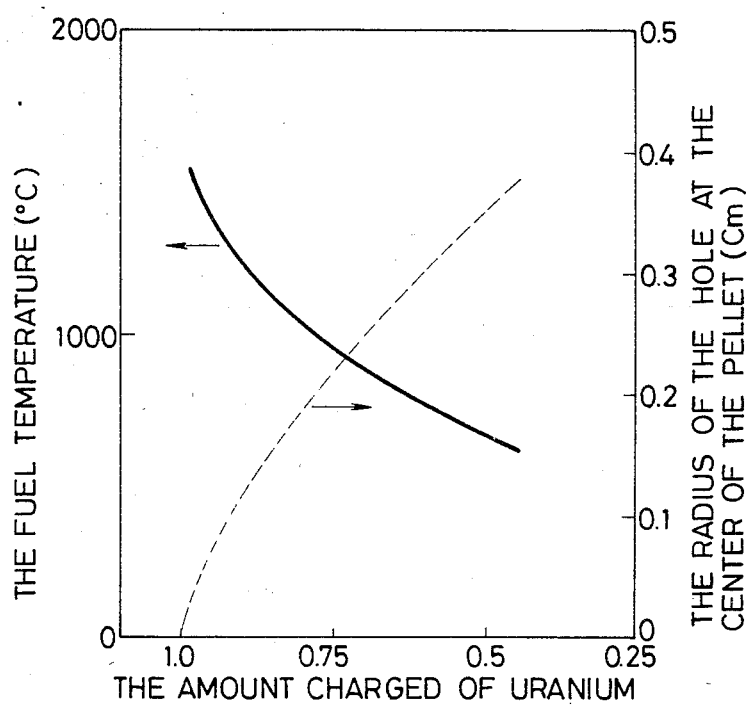
FIG. 6 is a graph skowing the relations of the amount charged of uranium to the radius of the hole at the center of the pellet and the fuel temperature.

In order to maintain the soundness of the fuel rod, it is preferred that the mechanical load on the covering tube and the release of the fission product (FP) from the fuel pellet be reduced. The release of FP from the fuel pellet depends greatly on the fuel temperature, and the release quantity of FP is increased as the fuel temperature is elevated. FIG. 6 shows the results of comparison of the fuel rod of the present embodiment with the conventional fuel rod with respect to the maximum fuel temperature throughout the irradiation period. In the present embodiment, the maximum fuel temperature can be reduced to 1200° C. from the conventional maximum fuel temperature of 1600° C. with the result that the release amount of FP can be reduced to about ⅓ of the conventional value.

Figure 7:
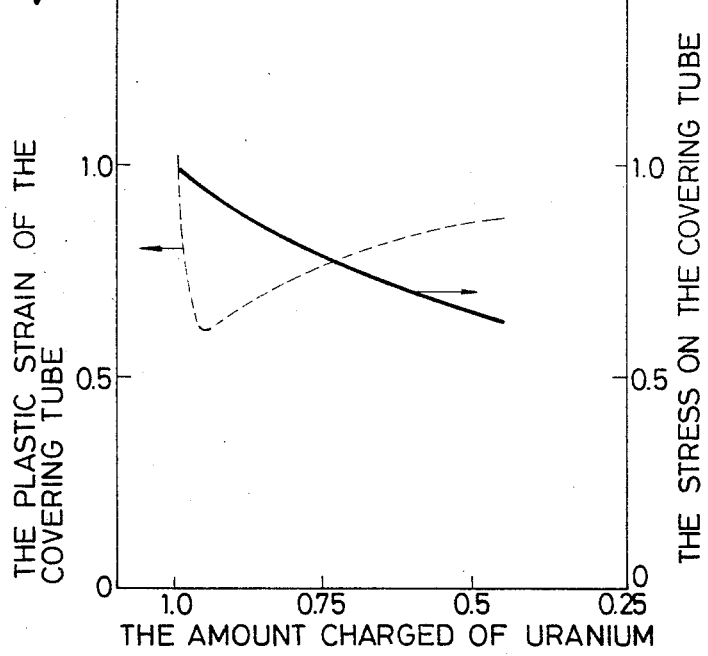
FIG. 7 is a graph showing the relation of the amount charged of uranium to the stress on the covering tube and the plastic strain of the covering tube.

Furthermore, by reduction of the fuel temperature, expansion of the fuel pellet can be controlled to a low level, whereby the mechanical load imposed on the covering tube at the time of increase of the power can be moderated. FIG. 7 shows the change of the stress on the covering tube, which is caused when the power is abruptly increased from the linear power density of 8 KW/ft to that of 13.4 KW/ft at the terminal stage of burning. Since the terminal expansion of the fuel pellet used in the present invention is small, the stress at the maximum linear power density of 13.4 KW/ft is reduced to ⅔ of the value of the conventional fuel rod.

Moreover, the reduction of the fuel temperature is effective for reducing the fuel swelling which causes increase of the plastic strain of the covering tube at the time of high power burning. In FIG. 7, the conventional fuel rod is compared with the fuel rod used in the present invention with respect to the plastic strain of the covering tube at the terminal stage of burning. In the covering tube of the fuel rod used in the present invention, the plastic strain is reduced to about 7/10 of the plastic strain in the conventional fuel rod.

In view of the foregoing experimental facts, it is seen that in the fuel rod used for the fuel assembly of the present invention, the fuel soundness at the time of abrupt increase of the power or at the time of high power burning can be improved.

Figure 8:
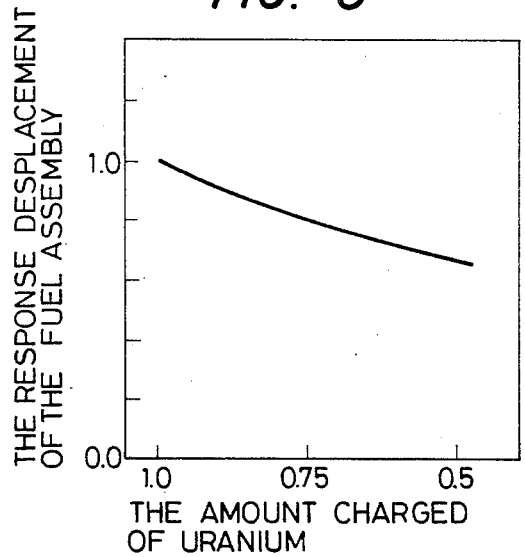
FIG. 8 is a graph illustrating the relation between the amount charged of uranium and the response displacement of the fuel assembly.

FIG. 8 shows a response displacement of the fuel assembly at the time of an earthquake in a reactor site where the difference of the characteristic frequency between a reactor building and the fuel assembly is 0.04 second. In the present embodiment, since the amount charged of uranium is ⅔ of the conventional value and the weight of the fuel assembly is 80% of the conventional value, the characteristic frequency of the difference of the characteristic frequency between the reactor building and the fuel assembly is increased by 50%, with the result that the response displacement of the fuel assembly at the time of an earthquake can be reduced by about 30%. In a reactor site where the base rigidity is higher and the difference of the characteristic frequency between the reactor building and the fuel assembly is smaller than 0.04 second, the response displacement of the fuel assembly can be reduced below the above-mentioned value. Therefore, according to the present embodiment, by virtue of the improved earthquake resistance, a reactor can be set even at a place where a maximum earthquake acceleration is higher by about 30% than the conventional higher limit.

Figure 9:
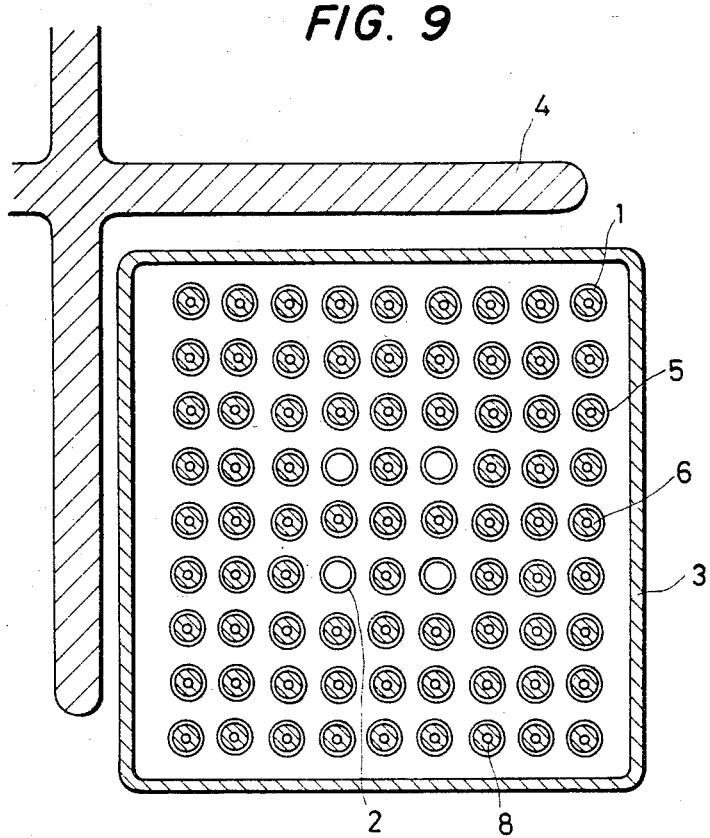
FIG. 9 is a cross-sectional view showing a fuel assembly according to another embodiment of the present invention.

FIG. 9 shows an embodiment of the above-mentioned third method according to the present invention. In the present embodiment, the amount charged of uranium is reduced by reducing the outer diameter of the fuel rod. In this case, since the area for removing heat from the fuel rod by the coolant is reduced, the existent 8-lines/8-columns lattice arrangement is changed to the 9-lines/9-columns lattice arrangement as shown in FIG. 9, and the quantity of heat generated from one fuel rod is reduced to moderate thermal conditions. More specifically, if the quantity of heat generated from the fuel assembly as a whole is the same, the quantity of heat generated from one fuel rod is reduced to about 80% of the conventional value. Accordingly, the minimum critical power ratio MCPR is increased by 6% as compared with the conventional value and a thermal margin is increased. In the present embodiment, four water rods are adopted, but in case of the 9-lines/9-columns lattice arrangement, 2 to 5 water rods may ordinarily be adopted.

Figure 10:
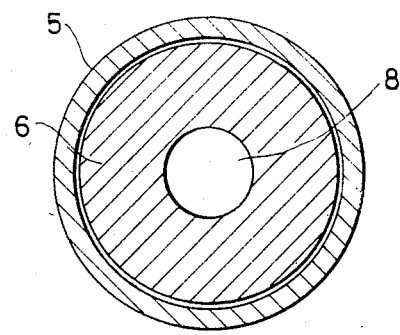
FIG. 10 is a cross-sectional view showing a fuel rod used for the fuel assembly shown in FIG. 9.

FIG. 10 is a cross-sectional view of the fuel rod used in the present embodiment. The outer diameter and thickness of the covering tube are 10.55 and 0.77 mm respectively. A hollow fuel pellet 6 having an outer diameter of 8.80 mm and an inner diameter of 3.0 mm is contained in the covering tube 5. The amount charged of uranium is 80% of the conventional value and the weight of the fuel assembly is 88% of the conventional value.

In the case where a fuel rod having a small diameter is adopted, there is a possibility of increase of bending by irradiation because of reduction of the flexural rigidity of the fuel rod. In the present embodiment, the number of spacers, which is 7 according to the conventional technique, is increased to 8 and the space between adjacent spacers in the axial direction is shortened by 12%, whereby bending of the fuel rod is reduced as compared with bending of the fuel rod in the conventional technique. Although the pressure loss in the fuel assembly is increased by about 3% with increase of the number of the spacers, in the present embodiment, since the outer diameter of the fuel rod is 86% of the conventional value and the length of the wetting edge is small, the pressure loss in the fuel assembly is prevented from increasing beyond the conventional value.

In the present embodiment where the amount charged of uranium is reduced to 80% of the conventional value, in order to keep the power generated by the fuel assembly through its life constant, the average enrichment degree in the fuel assembly should be 3.2% by weight. In the present embodiment, since the channel area is increased by about 6% as compared with the channel area in the above-mentioned first embodiment, thermal reaction of neutron is carried out more effectively than in the conventional 8-lines/8-columns fuel assembly and the effective utilization ratio of uranium-235 can further be increased. As the result, the necessary amount of natural uranium can be saved by about 7% and SWU required for enrichment can be maintained at a level substantially equal to the conventional level. In the present embodiment, the water-to-uranium ratio is 1.3 times the conventional value, and the void coefficient is about 75% of the conventional value. Furthermore, the control rod value is increased by about 10% as compared with the conventional value. Accordingly, in the present embodiment, a core having a small negative power factor can be realized as well as in the first embodiment.

As described hereinbefore with respect to the first embodiment, in order to maintain a good fuel rod soundness, it is necessary to maintain the fuel temperature at a level as low as possible. In the fuel assembly of the present embodiment, since the number of fuel pellet-charged fuel rods is increased to 77 from 62 in the conventional 8-lines/8-columns fuel assembly, the power per unit length of the fuel assembly is the same as in the conventional fuel assembly, and the liner power density of each fuel rod can be reduced to 62/77 of the conventional value. Accordingly, the amount of FP produced in each fuel rod during the same burning period is reduced. In the fuel assembly of the present invention, since fuel rods charged with a hollow fuel pellet are used, the fuel temperature can be lowered remarkably as compared with the fuel temperature in the conventional 8-lines/8-columns fuel assembly by virtue of the effect of such specific fuel rods as well as the above-mentioned effect of reducing the linear power density. The maximum temperature during the burning period is shown in Table 1. The maximum temperature is reduced by 600° C. as compared with the maximum temperature in the conventional fuel rod, which is as high as 1600° C. Namely, in the present embodiment, the maximum temperature is 1000° C.

Since the amount of FP produced in the fuel rods is reduced and the fuel temperature is lowered, release of FP into the fuel rods can be controlled to about 1/5 of the conventional level. In view of the fact that the inner diameter of the covering tube is reduced to about 4/5 of the conventional value, it will readily be understood that the amount of corrosive FP adhering to the inner surface of the covering tube can be reduced to about ¼ of the conventional value.

Furthermore, since the fuel temperature is lowered, thermal expansion of the fuel pellet at the time of increase of the power and swelling of the fuel can be controlled, with the result that the stress on the covering tube at the time of increase of the power and the plastic strain of the covering tube at the terminal stage of burning can be reduced. Results of comparison of the fuel rod of the present embodiment with the conventional fuel rod with respect to the stress on the covering tube and the plastic strain of the covering tube are shown in Table 1. From Table 1, it is seen that both the stress and the strain are reduced in the fuel rod of the present embodiment as compared with the values of the conventional fuel rod, and the present embodiment is very effective for maintaining a good soundness of the fuel rod.

Furthermore, in the present embodiment, since the weight of the fuel assembly can be reduced by 12%, the response displacement of the assembly at the time of an earthquake can be reduced by more than 10%, and the earthquake resistance can be improved.

Moreover, since the void coefficient can be reduced to about 75% of the conventional value, the core stability can be improved.

TABLE 1

|  | Fuel Rod of Present Invention | Conventional Fuel Rod |
| --- | --- | --- |
| Maximum Fuel Temperature (°C.) | 1000 | 1600 |
| Amount Released of FP (relative value) | 0.25 | 1.0 |
| Stress on Covering Tube (relative value) | 0.6 | 1.0 |
| Plastic Strain of Covering Tube (relative value) | 0.7 | 1.0 |

We claim:
1. A fuel assembly for a boiling water reactor, having a plurality of fuel rods, said fuel rods having enriched uranium therein, said fuel rods being grouped into a bundle, said bundle being surrounded by a channel box, characterized in that in the central portion, in the axial direction, of the fuel assembly, exclusive of the upper and lower end portions, which central portion corresponds to 80% of the length, in the axial direction, of the fuel assembly, the total amount charged of (1) the total quantity of uranium and (2) plutonium is in the range of 0.28 to 0.40 kg per 175 cm$^2$ of the sectional area per cm of the length in the channel box.

2. A fuel assembly according to claim 1, wherein said fuel rods include a plurality of annular fuel pellets.

3. A fuel assembly according to claim 2, wherein said plurality of annular fuel pellets provide a hollow portion in the center of said fuel rods, and said fuel rods further comprise a support in said hollow portion.

4. A fuel assembly according to claim 3, wherein said support is a tube.

5. A fuel assembly according to claim 1, wherein the uranium and plutonium charged into the fuel rods is oxide powder of uranium and plutonium having incorporated therewith a substance having a high heat conductivity and low neutron-absorbing capacity.

6. A fuel assembly according to claim 5, wherein said substance is a material selected from the group consisting of SiC and BeO.

7. A fuel assembly according to claim 1, wherein said bundle is a 9-lines/9-columns lattice arrangement.

8. A fuel assembly according to claim 7, wherein said bundle includes 2-5 water rods.

9. A fuel assembly according to claim 7, wherein said fule rods include a plurality of annular pellets.

10. A fuel assembly according to claim 1, wherein the average enrichment is 3.2% by weight.

11. A fuel rod for use in a boiling water reactor, said fuel rod having enriched uranium therein, characterized in that in the central portion, in the axial direction, of said fuel rod, exclusive of the upper and lower end portions, which central portion corresponds to 80% of the length, in the axial direction, of the fuel rod, the total amount charged of (1) the total quantity of uranium and (2) plutonium is in the range of 0.28 to 0.40 kg per 175 cm$^2$ of the sectional area per cm of the length.

* * * * *